United States Patent
Phillips et al.

(10) Patent No.: US 7,509,204 B2
(45) Date of Patent: Mar. 24, 2009

(54) METHOD AND SYSTEM USING TIRE STRETCH DATA TO CONTROL BRAKING

(75) Inventors: James R. Phillips, South Bend, IN (US); David A. Kolberg, Granger, IN (US)

(73) Assignee: Honeywell International Inc., Morristown, NJ (US)

( * ) Notice: Subject to any disclaimer, the term of this patent is extended or adjusted under 35 U.S.C. 154(b) by 414 days.

(21) Appl. No.: 11/349,934

(22) Filed: Feb. 9, 2006

(65) Prior Publication Data

US 2007/0106446 A1 May 10, 2007

Related U.S. Application Data

(60) Provisional application No. 60/651,631, filed on Feb. 11, 2005.

(51) Int. Cl.
*B60T 8/176* (2006.01)
*G06F 7/00* (2006.01)

(52) U.S. Cl. .......................... 701/70; 701/79; 303/155; 303/167

(58) Field of Classification Search ........................ None
See application file for complete search history.

(56) References Cited

U.S. PATENT DOCUMENTS

| | | | |
|---|---|---|---|
| 3,768,873 A | 10/1973 | Hirzel | |
| 4,022,513 A | 5/1977 | Hirzel et al. | |
| 4,327,413 A | 4/1982 | Ruof | |
| 4,336,592 A | 6/1982 | Beck | |
| 4,338,669 A | 7/1982 | Skarvada | |
| 4,720,794 A | 1/1988 | Skarvada | |

(Continued)

FOREIGN PATENT DOCUMENTS

JP 11-70870 * 3/1999

(Continued)

OTHER PUBLICATIONS

Phillips, James R., "A Longitudinal Slip Tire Model for Brake Control Systems: Features and Uses in Simulation, Control Synthesis and Stability Analysis", *Society of Automotive Engineers, Inc.*, 2002-01-2949, (2002).

*Primary Examiner*—Michael J. Zanelli
(74) *Attorney, Agent, or Firm*—Birch, Stewart, Kolasch & Birch, LLP

(57) ABSTRACT

A method of controlling a braking force applied to at least one wheel supporting a tire that includes steps of issuing a braking command (100), commanding an amount of tire stretch based on the braking command (102), estimating an amount of tire stretch for the tire based at least in part on wheel speed (104), and controlling the braking force applied to the wheel so that the estimated amount of tire stretch approaches the commanded amount of tire stretch (106). Also, a system (10) for controlling braking based on a determination of tire stretch that includes a tire stretch command generator (12) generating a tire stretch command based on a braking command, a reference velocity estimator (46) producing a first signal indicative of a velocity, a tire stretch estimator (30) producing a second signal indicative of an amount of tire stretch, and a brake force command generator (18) generating a brake force command based on the braking command, the first signal and the second signal.

15 Claims, 8 Drawing Sheets

U.S. PATENT DOCUMENTS

| | | |
|---|---|---|
| 4,773,013 A | 9/1988 | Crapanzano et al. |
| RE33,486 E | 12/1990 | Hirzel et al. |
| 5,136,510 A | 8/1992 | Beck |
| 5,180,214 A | 1/1993 | Yeh et al. |
| 5,333,942 A | 8/1994 | Peczkowski et al. |
| 5,646,848 A * | 7/1997 | Walenty et al. ............... 701/70 |
| 5,707,118 A | 1/1998 | Kolberg et al. |
| 5,918,951 A | 7/1999 | Rudd, III |
| 6,088,646 A | 7/2000 | Wiel |
| 6,125,318 A | 9/2000 | Zierolf |
| 6,178,370 B1 | 1/2001 | Zierolf |
| 6,220,676 B1 | 4/2001 | Rudd, III |
| 6,711,488 B2 | 3/2004 | Zierolf |
| 6,890,041 B1 * | 5/2005 | Ribbens et al. ............. 303/126 |
| 2003/0192375 A1 * | 10/2003 | Sugai et al. .................. 73/146 |
| 2005/0212356 A1 * | 9/2005 | Huchard et al. ............. 303/112 |

FOREIGN PATENT DOCUMENTS

WO    WO 2004/013592 A2 *   2/2004

* cited by examiner

TIRE STRETCH / ANTISTRETCH CONTROLLER

METHOD AND SYSTEM USING TIRE STRETCH DATA TO CONTROL BRAKING

RELATED APPLICATIONS

The present application claims the benefit of U.S. Provisional Patent Application No. 60/651,631 filed Feb. 11, 2005, the entire contents of which are hereby incorporated by reference.

FIELD OF THE INVENTION

The present invention is directed toward a braking system and method that uses tire stretch information to control a braking operation, and, more specifically, toward an aircraft braking system and method of operating same that controls antiskid braking functions and/or differential deceleration using tire stretch data.

BACKGROUND OF THE INVENTION

Designs of braking systems, especially aircraft braking systems, require an understanding of tire dynamics that can be provided by reference to tire models. However, aircraft brake control system design and analysis impose unique requirements on tire modeling. Dynamical models employed for longitudinal slip should be valid in the control frequency region and at all vehicle speeds. In addition, they should reproduce the main features of tire skidding behavior. Finally, the should reduce properly to linearized models in the skid and non-skid regimes which can be employed for antiskid control systems design and stability analyses. A method of modeling tire stretch is discussed below.

DEFINITIONS

The following definitions will be referred to from time to time herein and are collected here for ease of reference:
$d_s$ tire damping with respect to $\sigma$
$F_d$ horizontal drag force
$F_{rd}$ requested drag force
$F_v$ vertical load force
$l_w$ wheel/brake/tire rotational inertia
$J$ tire relaxation length
$k_s$ tire stiffness with respect to $\sigma$
$M_v$ vehicle mass
$R$ free (unloaded) radius of tire
$R_r$ rolling radius of tire
$R_0$ unbraked rolling radius of tire
$R_d$ deflected radius of tire
$s$ circumferential position; or Laplace transform variable (time differentiation operator), depending on context
$t$ independent time variable
$u$ longitudinal tread displacement
$V_x$ horizontal velocity component of axle with respect to the ground
$\hat{V}_x$ estimated value of $V_x$
$\delta$ small variation operator
$\theta$ wheel rotational displacement
$\lambda$ longitudinal tire stretch within the contact region
$\mu$ coefficient of friction
$\sigma$ longitudinal tire slip (normalized longitudinal tire stretch)
$\hat{\sigma}_i$ estimated value of $\sigma$ for the i-th wheel
$\sigma_l$ slip ratio (conventional definition)
$\sigma_{ss}$ steady-state value of $\sigma$
$\tau_b$ brake torque
$\tau_e$ excess brake torque
$\omega$ wheel speed
$\omega_s$ sliding speed of tread within the contact region
$\Omega_s$ synchronous wheel speed Conventional models of tire drag force due to braking are constructed such that they predict drag force as a function of slip ratio $\sigma_l$, where $\sigma_l$ is defined as $$\sigma_1 = 1 - \frac{\omega R_0}{V_x} \quad (1)$$

The use of the unbraked rolling radius in the numerator of Equation (1) assures that the slip ratio will evaluate to zero when brakes are not applied. To find the functional form of the relationship between drag and slip ratio, assumptions are made about how the tire deforms, and when the tread begins to slide, rather than adhere, to the road surface. In a typical approach to this task, the tire tread is assumed to deform continuously as it travels from the front to the rear of the contact region, building up shear stress as it does so. When local shear stress exceeds the maximum static value, determined by local normal pressure and coefficient of friction, the tread elements begin to slide, rather than adhere to the road surface. With appropriate assumptions regarding the normal pressure distribution and the longitudinal stiffness of the tread elements, a complete functional form for drag vs. slip ratio is obtained. The assumed tire parameters can be adjusted until the model predictions fit experimental results. The method can be refined by assuming a parabolic distribution of normal force over the contact region, as opposed to a uniform pressure distribution. These tread modeling approaches are sometimes called brush models, because the tire tread elements are assumed to behave as if they were elastic, undamped, massless bristles.

Several issues arise in connection with such models. First, there is a computational singularity in Equation (1) at zero horizontal speed. This means that the slip ratio and resulting drag calculations will be more and more ill-conditioned as vehicle speed approaches zero. This is exactly how most antiskid simulations proceed, and as a result, the numerical integration algorithms employed in the simulation may become numerically unstable in a speed range where antiskid performance must be evaluated. It is not possible to simulate the vehicle coming to a full stop.

Second, the brush model of tire tread deformation is not in agreement with the known behavior of tread deformation at low speeds and low drag forces. Under these conditions, it is known that most longitudinal tread deformation actually takes place outside the contact region. The apparent slip is primarily due to stretching of the tire tread outside the contact region, rather than a deformation gradient inside the contact region.

Finally, consider a thought experiment. Suppose an impulse of torque, acting on the wheel, changes the wheel speed instantaneously. Equation (1) predicts an instantaneous change in slip ratio, which will lead to instantaneous changes in drag force. Yet this should not be so. No relative motion of the tread elements takes place during the impulse, which occurs in a vanishingly small time interval. Without relative motion, there can't be any change in the shear strains that determine the total drag force in the conventional (brush model) drag formulations. There is an implicit assumption in these formulations that the strain distribution within the contact region redistributes itself instantaneously to be consistent with changes in wheel speed, which certainly is not the case.

A frequency domain solution to this issue for brush models is known that involves the passage time of a tread element through the contact patch. It can be shown that the frequency response of the drag force to variations in slip ratio is well approximated by a single lag, with time constant equal to the passage time of a tread element through the contact region. This approximation could be incorporated into a time-based simulation, but a different approach is used herein.

The starting point for our derivation of the kinematics of tire stretch is FIG. 6 which illustrates how the tread of a tire 200 stretches at low speed, under the influence of braking. Under the influence of a drag load Fd, the tire tread deforms, and tread displacement u is a function of circumferential position s, being nearly constant within the tread contact region, where it has value $\lambda$. As s passes out of the contact region, from d toward e, displacement u decays exponentially, with relaxation length J determining the initial slope of the decay.

For relatively low drag forces, the tire 200 rolls without sliding in the contact region. The effective radius of the tire at the front of the contact region is the rolling radius Rr, as shown in FIG. 7. If then the tire 200 rolls forward a differential distance dx, while it rotates through the differential angle $d\theta$ the resulting change $d\lambda$ in the value of tire stretch is $$d\lambda = dx - R_r d\theta \tag{2}$$

Rolling radius may be shown to be given by $$R_r = R_o + R\left(\frac{\lambda}{J}\right), \omega > 0. \tag{3a}$$

When the possibility of negative wheel speeds is accounted for, the correct expression for rolling radius is found to be $$R_r = R_0 + R\left(\frac{\lambda}{J}\right)\text{sgn}(\omega) \tag{3b}$$

This correction is necessary to account for the fact that the tire is actually in compression, rather than tension, when the signs of $\omega$ and $\lambda$ differ. Substituting Equation (3b) into Equation (2), and dividing by a differential time interval dt, we find the time derivative of tire stretch is:

$$\frac{d\lambda}{dt} = V_x - \left[R_0\omega + R|\omega|\left(\frac{\lambda}{J}\right)\right] \tag{4}$$

To maintain consistency with conventional slip formulations, it is convenient to work with a normalized form of tire stretch, defined as $$\sigma \equiv \frac{R\lambda}{R_0 J} \tag{5}$$

By substitution of Equation (5) into Equation (3b), we find that $\sigma$ is related to rolling radius Rr as $$R_r = R_0[1 + \sigma\text{sgn}(\omega)] \tag{6}$$

which shows that $\sigma$ could also be defined as the fractional change in rolling radius, under the influence of braking.

The differential equation for $\sigma$ can be found from Equations (4) and (5) to be $$\frac{d\sigma}{dt} = \left(\frac{R}{J}\right)\left(\frac{V_x}{R_0} - (\omega + |\omega|\sigma)\right) \tag{7}$$

The steady-state value of $\sigma$ may be found by equating the derivative of $\sigma$ to zero, and solving for $\sigma$ss. When we do so, we obtain $$\sigma_{ss} = \left(\frac{V_x}{R_0\omega} - 1\right)\text{sgn}(\omega) \tag{8}$$

If we assume a positive value for $\omega$, then we may find from Equation (1), the following relationship between the conventional slip ratio $\sigma$l, and $\sigma$ss:

$$\sigma_{ss} = \frac{\sigma_1}{1 - \sigma_1}, \omega > 0. \tag{9}$$

From this point on we deal only with the normalized value of tire stretch $\sigma$, which we will call longitudinal tire slip. It is customary to assume that, under braked rolling conditions, the relaxation length J is approximately equal to the free radius R, in which case Equation (7) reduces to:

$$\frac{d\sigma}{dt} = \left(\frac{V_x}{R_0} - (\omega + |\omega|\sigma)\right), R \approx J. \tag{10}$$

This assumption will be made throughout the remainder of this application. If more accurate knowledge of relaxation length indicates otherwise, the more general result in Equation (7) can be used in every place where Equation (10) is used below.

At low braking levels, where it is valid to assume no sliding in the contact region, we may assume a force balance exists between drag and tire stretch, expressed as the linear model $$F_d = k_s\sigma + d_s\dot{\sigma} \tag{11}$$

where ks and ds are stiffness and damping coefficients, respectively. The stiffness coefficient ks can be determined from dynamometer stops by finding the best linear fit between slip ratio and drag force (or deceleration). Accurate estimation of the damping coefficient ds from dynamometer data is difficult, but in practice, rough estimates of damping are adequate for modeling purposes. The best systematic approach for estimating tire stiffness and damping coefficients over a range of operating conditions is probably the use of linear system identification algorithms operating on digital test data. It may also be possible to obtain an improved estimate of tire relaxation length in this manner.

The remaining equation required for complete simulation of the short period dynamics of the wheel is the torque balance:

$$I_w\dot{\omega} = R_d F_d - \tau_b \tag{12}$$

where Iw is the rotational inertia of the wheel/brake/tire assembly, Rd is the deflected radius of the tire, and $\tau_b$ is the applied brake torque. By short period it is meant that the vehicle speed Vx is sensibly constant. FIG. 8 displays a complete simulation diagram for short period wheel dynamics at low braking levels.

The diagram in FIG. 8 is nonlinear, but may be linearized about an equilibrium point to find a transfer function from brake torque to tire slip. One such equilibrium point is the condition of zero brake torque and zero slip. The corresponding equilibrium value for $\omega$ is the synchronous speed $\Omega$s, defined as $$\Omega_s \equiv \frac{V_x}{R_0} \tag{13}$$

Under these conditions, the transfer function from small changes in torque to small changes in slip is found to be $$\frac{\delta\sigma}{\delta\tau_b} = \frac{1}{I_w s^2 + (d_s R_d + I_w \Omega_s)s + k_s R_d} \tag{14}$$

This transfer function has been found to provide frequency response predictions to the accuracy required to design a closed loop slip controller based on wheel speed feedback. It may be noted that the synchronous wheel speed term increases the damping of the transfer function. However, a non-zero slip damping coefficient is required at low speeds, to prevent an underdamped response. Selection of the slip damping coefficient to yield a desired damping ratio at zero synchronous speed is one method to get reasonable simulation results.

As brake torque increases to higher values, the uncritical use of Equations (10) and (11) would predict a drag force greater than the tread-ground contact region can support, due to the limited coefficient of friction $\mu$. It is necessary to reformulate the kinematics and dynamics so that the friction-limited constraint on drag force is not violated. It is not difficult to update the kinematics derivation above with an assumed rate of sliding between the tire tread and the ground. The crux of the problem, however, is to compute the drag force from the assumed motions.

We begin with the observation that Equation (11) is actually more fundamental than Equation (10). Whatever the drag force is, even under friction-limited conditions, Equation (11) will predict the correct rate of change for tire slip. This becomes clear when it is rewritten to give the tire slip rate directly:

$$\dot{\sigma} = \frac{F_d - k_s \sigma}{d_s} \quad (15)$$

The ratio of ds to ks plays the role of a tire relaxation time constant in this formulation. This is another guide to the selection of the tire damping coefficient: it must be large enough to give a relaxation time constant several times larger than the integration step-size used in simulation, thereby achieving numerical accuracy and stability.

As a first approach to computing drag force from the motions, we may assume that the tire stretch rate is consistent with zero sliding whenever it can be without violating the drag force constraint, and otherwise is as large as it can be consistent with the constraint. A mathematical formulation of this approach is as follows: define a requested drag force $F_{rd}$ as $$F_{rd} = k_s \sigma + d_s \left( \frac{V_x}{R_o} - (\omega + |\omega|\sigma) \right), \quad (16)$$

which is the drag force that would be predicted from Equations (10) and (11) if there were no sliding in the contact region. The actual drag is then computed from the requested drag as $$F_d = \mu F_v \lim \left( \frac{F_{rd}}{\mu F_v} \right), \quad (17)$$

where Fv, is the vertical load force (assumed positive), and lim(x) is a normalized limiter function. This function is equal to the sign of x when the absolute value of x is greater than unity, and otherwise equal to x. It can be defined in terms of the absolute value function as:

$$\lim(x) = \frac{|x+1| - |x-1|}{2}. \quad (18)$$

By use of Equation (18), Equation (17) can be re-written in a form that does not require division by vertical load (which can be zero in landing simulations):

$$F_d = \frac{|F_{rd} + \mu F_v| - |F_{rd} - \mu F_v|}{2}. \quad (19)$$

When friction limiting is not active, the requested and actual drag forces are equal in the model, and the dynamic behavior and transfer functions reduce to those already presented above. When friction limiting is active, the actual drag force is constant, and equal to its maximum magnitude $\mu F_v$. In this scenario, we define the excess brake torque as $$\tau_e = \tau_b - \mu R_d F_v. \quad (20)$$

Wheel speed dynamics are driven directly by $\tau_e$:

$$I_w \dot{\omega} = -\tau_e \quad (21)$$

[friction limited]

Also, the sliding speed of the tread in the contact region is easily shown to be given by $$\omega_s = \frac{F_{rd} - F_d}{d_s} \quad (22)$$

When the tire slip has relaxed to its steady-state value $\mu F_v / k_s$, the tread sliding speed is found to be $$\omega_s = \Omega_s - \omega \left( 1 + \frac{\mu F_v}{k_s} \right). \quad (23)$$

[friction limited]

These results are very significant for the design of an antiskid controller. They suggest that the primary objectives of a skid relief brake controller should be to: 1) detect the onset of a friction-limited condition, 2) reduce the excess brake torque quickly to zero [Equation (20)], and 3) reduce the tread sliding speed quickly to zero [Equation (23)].

In other words, the design of a skid relief brake controller can be reduced to the design of a null-point regulator, if estimated values for excess torque and sliding speed are available. This is a significant result, especially because the model we have developed suggests approaches to designing an observer to estimate these quantities.

Notwithstanding its usefulness for antiskid control design, the model as presented has limited applicability for detailed simulation, as in performance evaluation studies. The primary reason is that, on the prediction of Equation (21), wheel speed has neutral stability in a skid, having a single pole at the origin in the s-plane. In actual practice, wheel speed in a skid on a dry surface is found to be strongly unstable, requiring very rapid pressure reductions for recovery.

A straightforward approach to capturing this realistic behavior in our model is to tailor the function that maps requested drag into actual drag. This is illustrated in FIG. 10. In the figure, the actual drag decreases as requested drag increases above the maximum available. This produces a mu-slip curve with a negative slope at high slip values (the "back side"), which creates the desired (for modeling purposes) unstable behavior at the onset of tread sliding. In a similar way, the slope of the actual vs. requested drag curve can be continuously reduced from unity to zero as slip increases from zero (the "front side"), producing a mu-slip curve with a negative curvature. These methods have been used successfully to produce realistic simulations at high braking levels.

Another method for producing the desired negative slope on the back side of the mu-slip curve is to use the tread sliding speed $\omega_s$ to drive a thermal model, which reduces available mu as the tire heats up. This approach has a realistic basis in physics, but it requires an extremely simple underlying thermal model to be practical for time based (e.g. real-time hardware in the loop) simulations. A semi-empirical model, with tunable thermal modeling parameters, has been found to give sufficiently accurate results.

It must be recognized that the primary design objective of an antiskid system is to detect and relieve skids in a fashion that is robust to time-varying levels of mu. The primary objective of an antiskid simulation is then to verify the desired controller robustness properties. Quantitative predictions of antiskid efficiency are facilitated by use of mu models that are realistic yet not too highly detailed.

In addition to the above described uses of the longitudinal tire slip model for antiskid control system design and simulation, two further fruitful applications exist in the areas of reference velocity estimation and landing gear stability analysis.

All antiskid systems require at least a reference velocity to be developed so that incipient skids may be detected from wheel speed measurements. At the most basic level, the system might simply set a slip ratio threshold, and fully relieve pressure when the threshold is exceeded. Whether slip ratio is defined using the conventional approach [Equation (1)] or using the slip model presented above, a reference velocity (Vx) is required for successful implementation.

A tire slip observer based on the full simulation diagram in FIG. 9 is well suited to provide the drag force estimate required to mechanize a reference velocity estimator. A continuous-time reference velocity estimate $\hat{V}_x$ for a multi-wheel vehicle can be mechanized based on the following force balance:

$$M_v \frac{d\hat{V}_x}{dt} = -\sum_i k_s \hat{\sigma}_i \qquad (24)$$

where Mv is the assumed vehicle mass, and $\hat{\sigma}_i$ is the estimated tire slip for the i-th wheel. Damping terms can be added to the equation, but are not necessary to achieve accurate results. When the estimated velocity is used as the reference speed input to a tire slip observer for each wheel, we obtain a fully integrated observer implementation, providing joint estimates of tire slip for each wheel and reference speed for all wheels.

In everything presented above, a constant vertical load and unbraked rolling radius has been assumed. In fact, lightly damped landing gear modes can contribute to significant load variations and consequent changes in rolling radius and wheel speed. A closed loop slip controller based on a constant rolling radius interprets changes in wheel speed as changes in slip, and responds by modifying brake pressure. This changes the drag load, which couples into the landing gear vibration modes. The resulting feedback loop has the potential to further destabilize landing gear modes that are already lightly damped.

The slip model presented above is well suited to support a stability analysis of a combined landing gear/slip control system, when appropriately linearized, and modified to account for the effect of a changing vertical load on the unbraked rolling radius Ro.

Antiskid braking operation is discussed in U.S. Pat. No. 5,918,951 to Rudd which is hereby incorporated by reference. Differential deceleration control is discussed, for example, in U.S. Pat. No. 5,707,118 to Kolberg, which is also hereby incorporated by reference.

SUMMARY OF THE INVENTION

These issues and others are addressed by the present invention which comprises, in a first aspect, a method of controlling a braking force applied to at least one wheel supporting a tire that includes steps of issuing a braking command, commanding an amount of tire stretch based on the braking command, estimating an amount of tire stretch for the tire based at least in part on wheel speed, and controlling the braking force applied to the wheel so that the estimated amount of tire stretch approaches the commanded amount of tire stretch.

Another aspect of the invention comprises a braking system that includes a tire stretch command generator generating a tire stretch command based on a braking command, a reference velocity estimator producing a first signal indicative of a velocity, a tire stretch estimator producing a second signal indicative of an amount of tire stretch, and a brake force command generator generating a brake force command based on the braking command, the first signal and the second signal.

DETAILED DESCRIPTION

Figure 1:
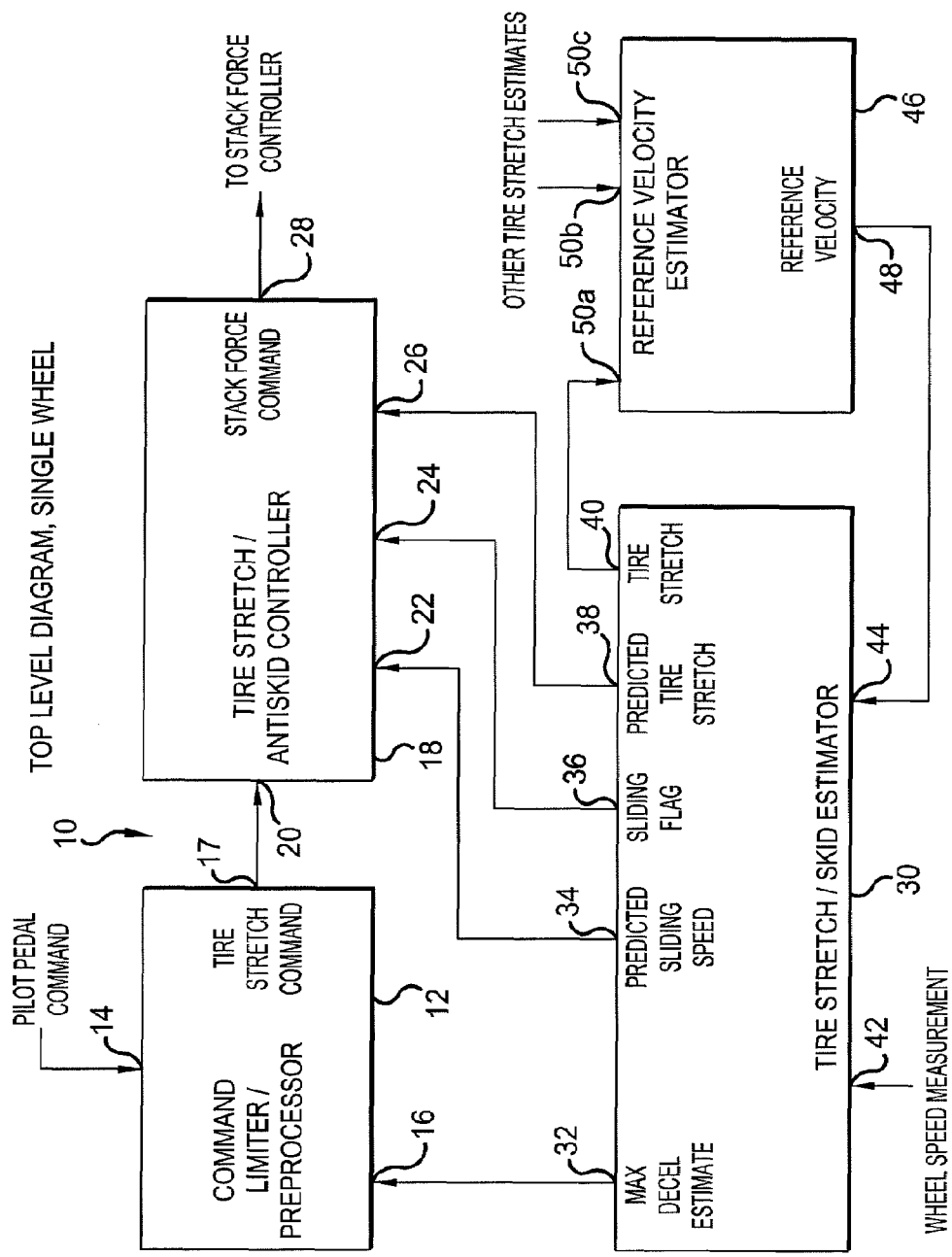
FIG. 1 schematically illustrates a control system according to an embodiment of the present invention.
Figure 10:
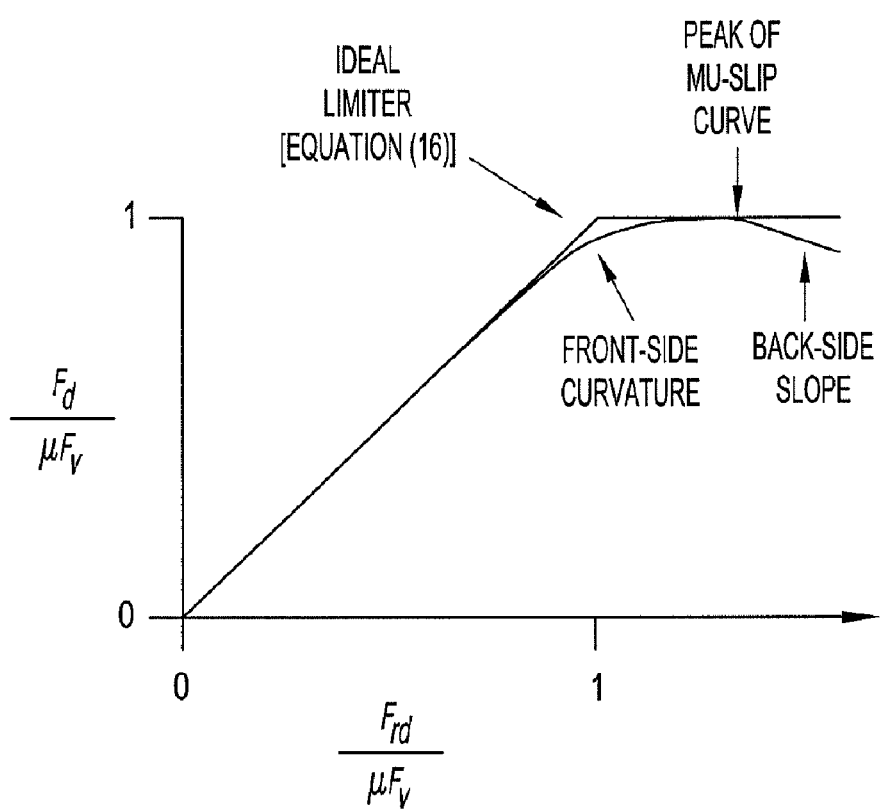
FIG. 10 illustrates a relationship between actual and requested drag.

Referring now to the drawings, wherein the showings are for purposes of illustrating preferred embodiments of the present invention only, and not for the purpose of limiting same, FIG. 1 shows a brake control system 10 for one of a plurality of braked wheels (not shown). Brake control system 10 constitutes a non-linear observer and controller for the wheel-tire dynamics illustrated in FIG. 10.

System 10 includes a command limiter or preprocessor 12 having a pilot pedal command input 14, a maximum deceleration input 16 and a tire stretch command output 17. Also illustrated is a tire stretch/antiskid controller 18 having a tire stretch input 20 connected to tire stretch command output 17 of preprocessor 12, a predicted (phase advanced) sliding speed input 22, a sliding flag input 24, a predicted (phase advanced) tire stretch input 26 and a stack force output 28. System 10 further includes tire stretch/skid estimator 30 having a maximum deceleration output 32 connected to maximum deceleration input 16 of preprocessor 12, a predicted sliding speed output 34 connected to predicted sliding speed input 22 of tire stretch antiskid controller 18, a sliding flag output 36 connected to sliding flag input 24 of tire stretch antiskid controller 18 and a predicted tire stretch output 38 connected to predicted tire stretch input 26 of tire stretch antiskid controller 18. Tire stretch skid estimator 30 also includes a tire stretch output 40, a measured wheel speed input 42 and a reference velocity input 44. System 10 further includes a reference velocity estimator 46 having a reference velocity output 48 connected to reference velocity input 44 of tire stretch skid estimator 30 and tire stretch estimate inputs 50a, 50b, 50c, one receiving tire stretch data for each wheel being controlled by system 10.

Figure 2:
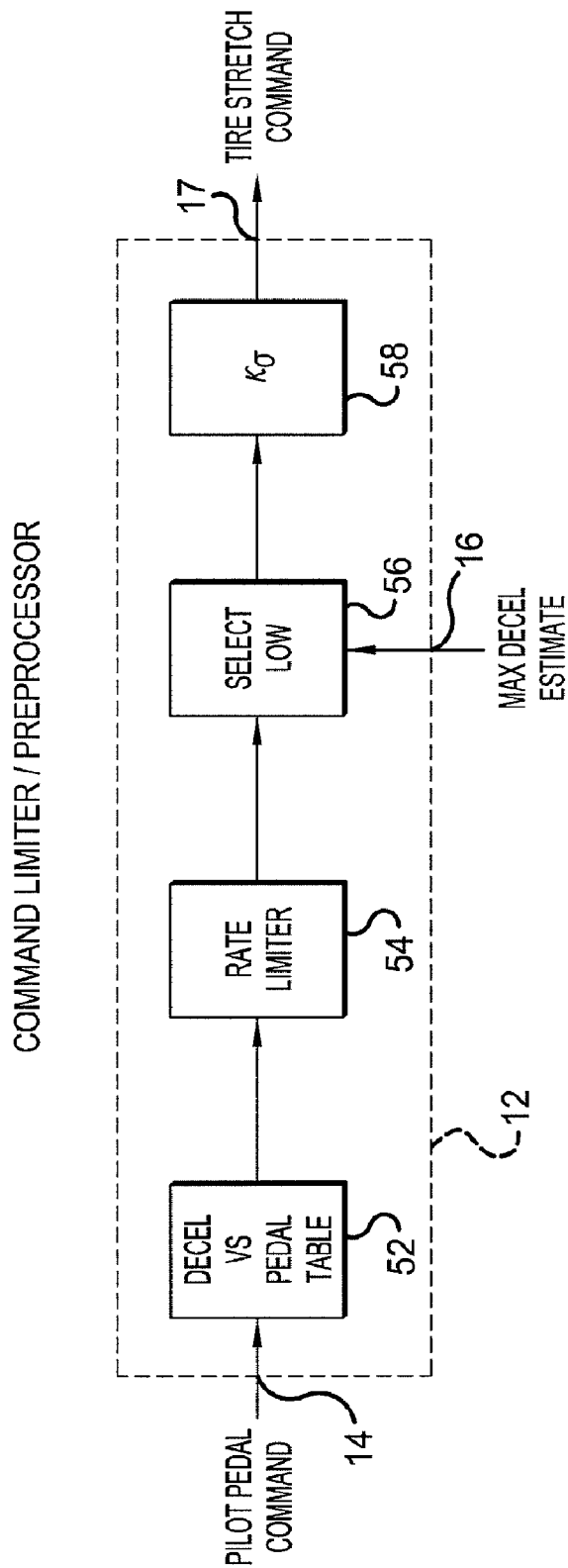
FIG. 2 schematically illustrates details of the command limiter/processor of FIG. 1.

FIG. 2 illustrates command limiter/preprocessor 12 in greater detail. Preprocessor 12 includes a table 52 containing information on deceleration rates corresponding to various pedal positions, a rate limiter 54, a low selector 56 and a tire stretch multiplier circuit 58.

Figure 4:
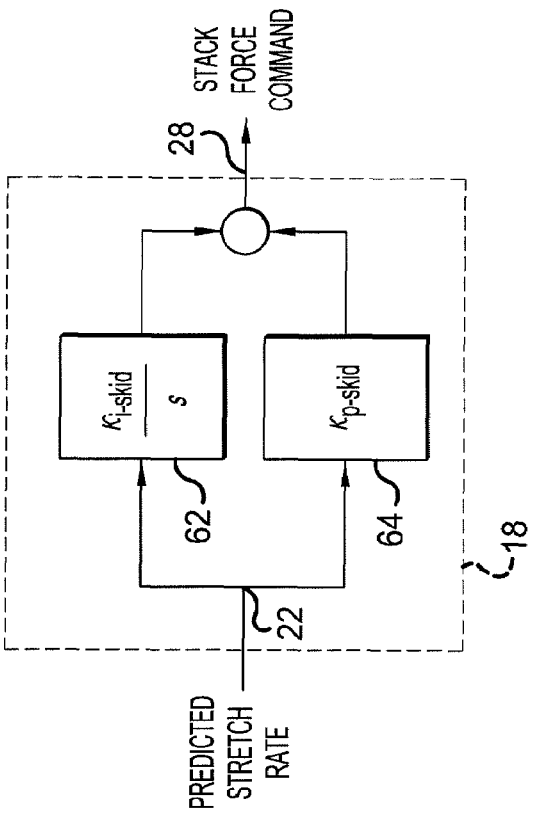
FIG. 4 schematically illustrates details of the tire stretch/antiskid controller of FIG. 1 when the sliding flag is true.
Figure 3:
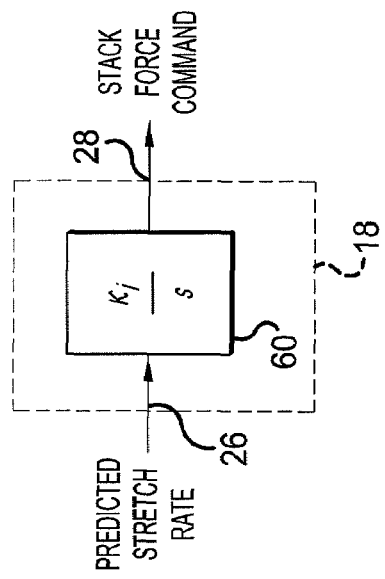
FIG. 3 schematically illustrates details of the tire stretch/antiskid controller of FIG. 1 when a sliding flag output by a tire stretch skid estimator is false.

FIG. 3 illustrates an integral gain circuit 60 in the tire stretch antiskid controller that converts a predicted stretch rate from tire stretch skid estimator 30 into a stack force command when the input at sliding flag input 24 is false or low. FIG. 4 illustrates the proportional gain circuit 62 in tire stretch antiskid controller 18 and the associated integral gain circuit 64 that converts a predicted sliding speed at predicted sliding speed input 22 to a stack force command when the input at sliding flag input 24 is true or high. Stack force may be provided by one or a plurality of hydraulic pistons, or by, or by one or a plurality of electric actuators. Operation with electric actuators requires matching the non-linear dynamic response of the actuator motor with antiskid operation. The limited force onset rates of the control are matched to the rate that the motor can achieve and the force reduction cycle of antiskid is matched to the no load speed of the motor for electric brake operation.

Figure 5:
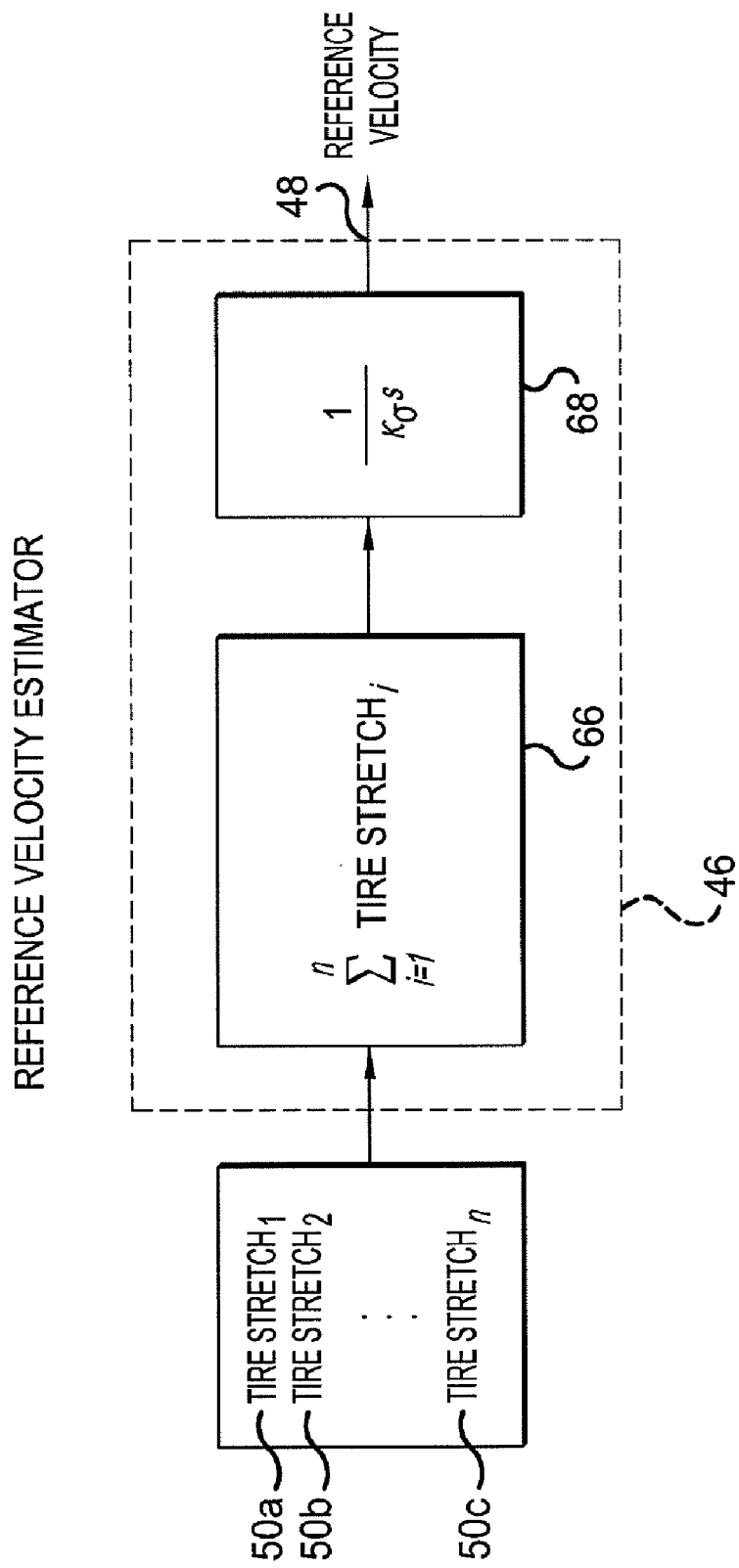
FIG. 5 schematically illustrates details of the reference velocity estimator of FIG. 1.
Figure 6:
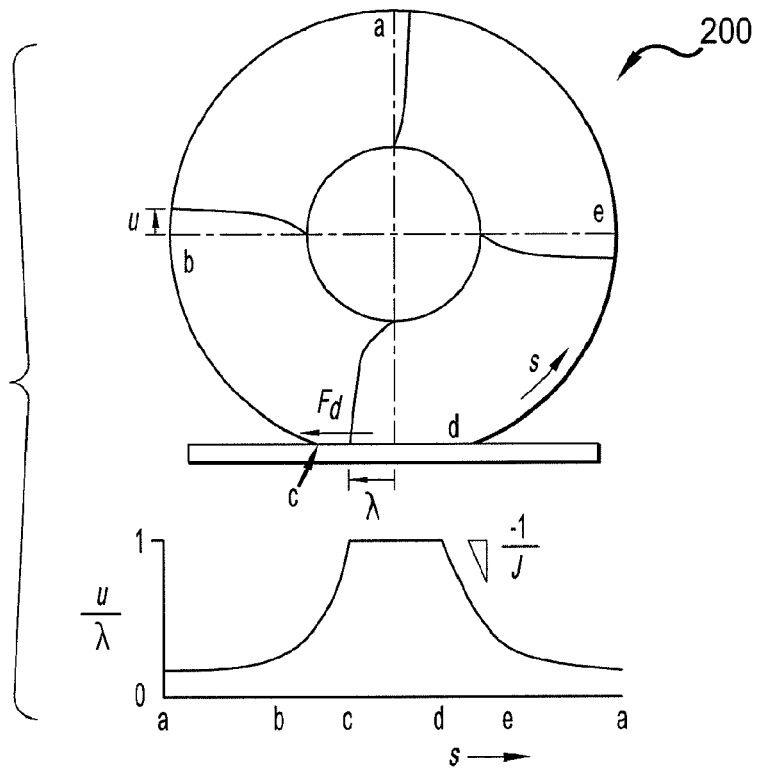
FIG. 6 schematically illustrates how the tread of a tire stretches at low speed under the influence of braking.
Figure 7:
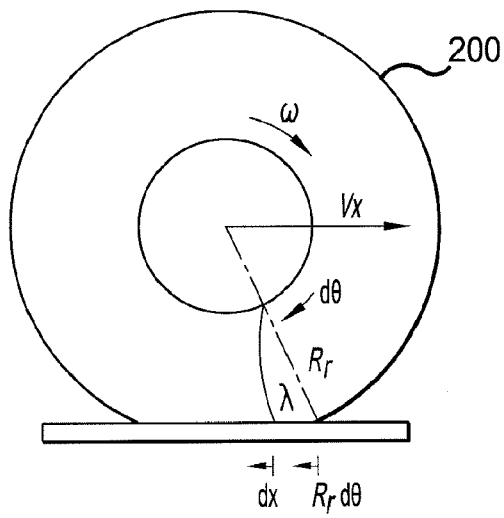
FIG. 7 schematically illustrates effective radius of a tire at the front of a contact region.
Figure 8:
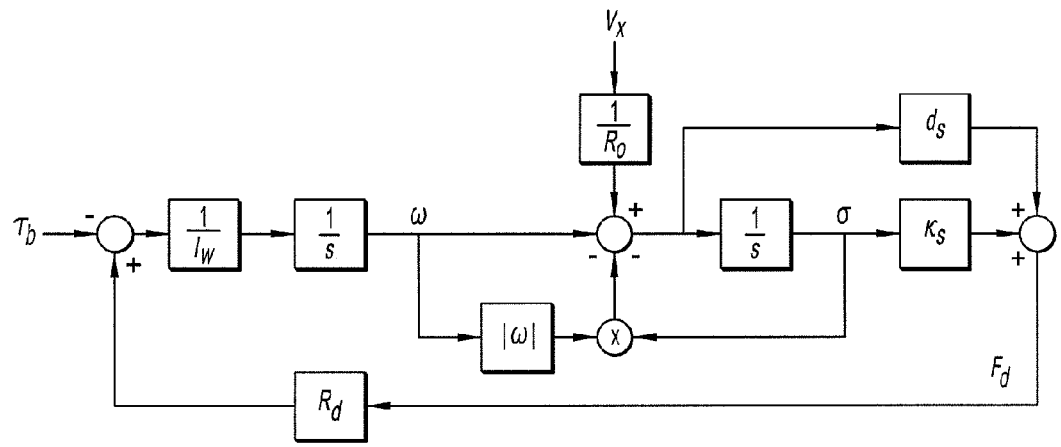
FIG. 8 is a simulation diagram for short period wheel dynamics at low braking levels.

FIG. 5 illustrates summing circuit 66 of reference velocity estimator 46 receiving tire stretch estimates from tire stretch estimate inputs 50a, 50b, 50c . . . and an integrator circuit 68 for producing a reference velocity output based on the summed tire stretch values.

Figure 9:
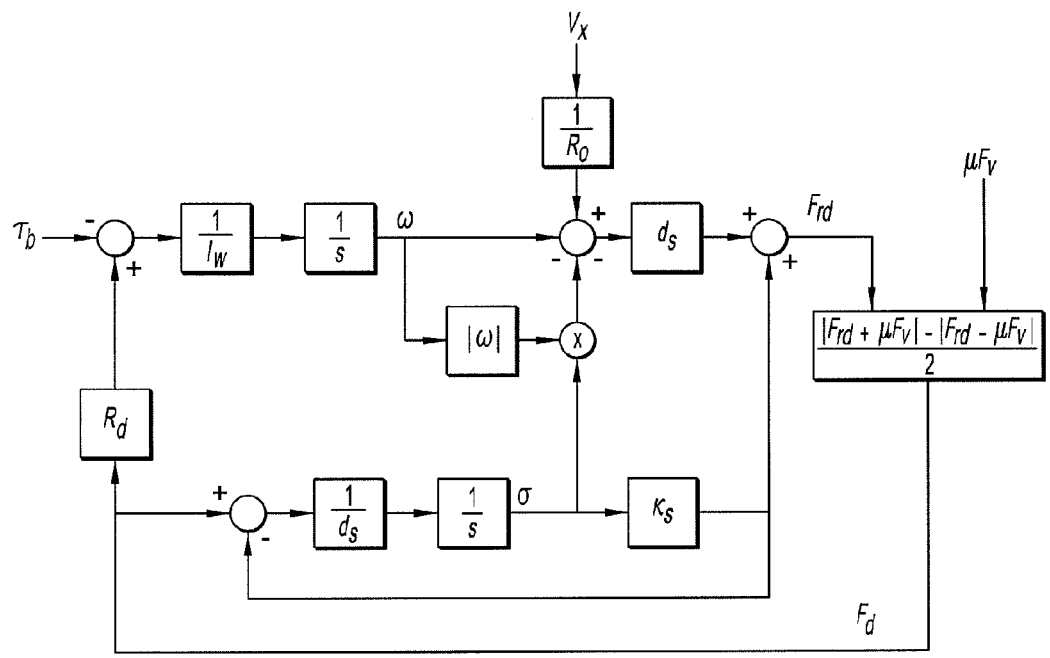
FIG. 9 is a simulation diagram for short period wheel dynamics at higher braking levels.

The tire-stretch/skid estimator of block 30 may be implemented by straightforward application of standard nonlinear observer design techniques to the nonlinear short-period dynamics of the tire and wheel illustrated in FIG. 9. These methods are familiar to those skilled in the art of digital control system design. The observer will be designed to estimate wheel speed, tire stretch, sliding speed, and maximum deceleration in a closed loop fashion that minimizes the difference between estimated wheel speed and measured wheel speed. The sliding flag will be set whenever the estimated sliding speed is greater than zero, and reset otherwise.

In operation, command limiter 12 is provided with maximum deceleration information at maximum deceleration input 16. This information is based on assumptions concerning the coefficient of friction (μ) of the surface supporting the aircraft, the mass of the aircraft, and the number of wheels/tires being braked. When a brake command is received from a pilot, a deceleration amount corresponding to the command is determined by reference to table 52, and this deceleration value is passed to rate limiter 54 which passes the estimate to selector circuit 56 which compares the requested deceleration amount to the estimated maximum possible deceleration. The lower of these two values is selected and multiplied by a gain kσ by multiplier circuit 58.

The conversion from deceleration command to tire stretch command is accomplished through a scale factor kσ which is derived from the tire spring constant ks, the number of braked wheels Nw, and the expected aircraft mass M according to the equation kσ=(M/ksNw).

When the sliding flag input 24 is false, the tire stretch antiskid controller 18 converts the tire stretch command received at tire stretch command input 20 to a brake force command through an integral controller acting on an error signal between commanded and predicted tire stretch. The control gain ki is determined by desired closed loop control bandwidth and the nominal steady state gain from stack force to tire stretch. Transfer functions derived above in the background section can be used to estimate gain requirements for a desired control bandwidth.

When the sliding flag input 24 is true, indicating that the tire is in a skidding condition, a two-term proportional integral controller is used to decrease stack force until the estimated sliding speed is reduced to zero. The control gains ki-skid and kp-skid are determined by desired closed loop sliding speed control bandwidth. Transfer functions presented in the background information above can be used to derive required control gains.

The output of the tire stretch antiskid controller 18 is a brake stack force command which is to be acted on by a stack force control apparatus. This could be accomplished by, for example, one or a plurality of electric motor actuators or one or a plurality of hydraulic pistons. The required performance characteristic of the stack force controller is that it produces the desired steady-state stack force within a reasonably short time period. Phase advance in the tire stretch skid estimator can partially offset stack force actuator time delay. For electric brake applications, the required rise rate of the force is mapped to the maximum rate the motors can operate under loaded conditions. The antiskid cycle of removing the force is mapped to the maximum speed the motor can operate under with no load as it will be moving with the force load as opposed to against the force load for increasing forces. By separating the two requirements out the actuator can be sized for what is actually required by the antiskid and brake control so the size and weight of the system can be kept to a minimum.

Reference velocity estimator 46, as illustrated in FIG. 5, sums the tire stretch values in a summing circuit 66 and integrates the result in integrator circuit 68 to provide a reference velocity to tire stretch skid estimator 30. This reference velocity can also be used in connection with differential deceleration control. The measured speeds at each wheel can be compared to this reference velocity and brake stack force can be adjusted as necessary to maintain deceleration control.

Figure 11:
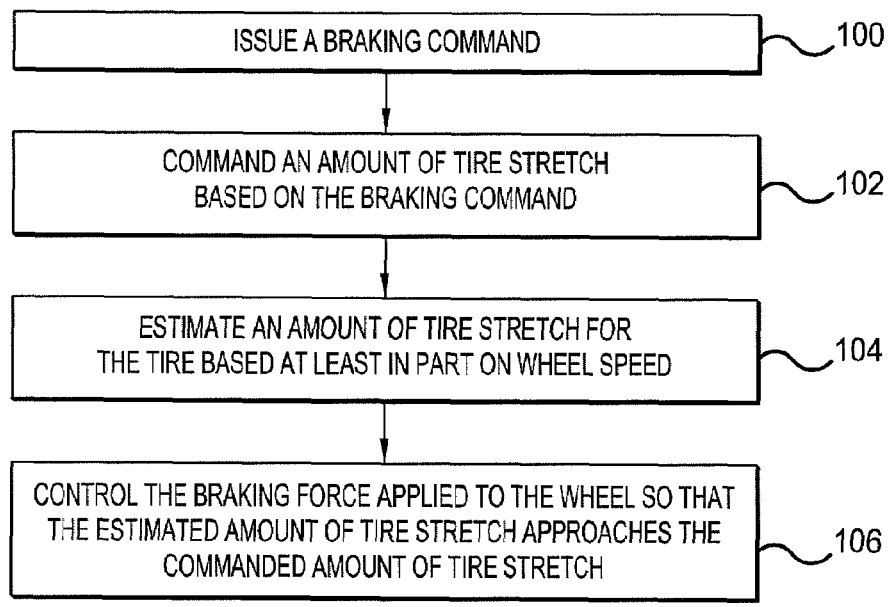
FIG. 11 illustrates the basic sequence of events that occurs in converting a braking command to a tire stretch command, and in controlling the braking force on a wheel to achieve the commanded tire stretch.

A method of controlling a braking force applied to at least one wheel supporting a tire is illustrated in FIG. 11 and includes a step 100 of issuing a braking command, a step 102 of commanding an amount of tire stretch based on the braking command, a step 104 of estimating an amount of tire stretch for the tire based at least in part on wheel speed and a step 106 of controlling the braking force applied to the wheel so that the estimated amount of tire stretch approaches the commanded amount of tire stretch.

The present invention has been described with reference to a preferred embodiment; however, it will be recognized that obvious modifications and additions can be made to this embodiment. It is intended that all such obvious modifications and additions comprise a part of this invention to the extent they fall within the scope of the several claims appended hereto.

We claim:

1. A method of controlling a braking force applied to at least one wheel supporting a tire comprising the steps of:
   issuing a braking command;
   commanding an amount of tire stretch based on the braking command;
   estimating an amount of tire stretch for the tire based at least in part on wheel speed; and
   controlling the braking force applied to the wheel so that the estimated amount of tire stretch approaches the commanded amount of tire stretch.

2. The method of claim 1 wherein said step of commanding an amount of tire stretch comprises the step of multiplying a value of the braking command by a scaling factor.

3. The method of claim 1 including the additional step of estimating a maximum deceleration rate and controlling the braking force applied to the wheel so as not to exceed the estimated maximum deceleration rate.

4. The method of claim 1 including the additional step of predicting an amount of tire stretch based on the estimated tire stretch and the braking force applied to the wheel.

5. The method of claim 1 including the additional step of determining a reference velocity from a measured wheel speed and a plurality of estimates of tire stretch amount.

6. The method of claim 1 including the additional steps of:
   detecting a sliding condition;
   predicting a sliding speed; and
   controlling the brake force applied to the wheel to reduce the sliding speed to zero.

7. The method of claim 1 including the additional steps of:
   detecting a deceleration at a first wheel and a deceleration at a second wheel;
   determining a difference between the deceleration at the first wheel and the deceleration at the second wheel; and
   controlling the brake force applied to at least the first wheel to reduce the difference to zero.

8. A braking system comprising:
   a tire stretch command generator generating a tire stretch command based on a braking command;
   a reference velocity estimator producing a first signal indicative of a velocity;
   a tire stretch estimator producing a second signal indicative of an amount of tire stretch; and
   a brake force command generator generating a brake force command based on the braking command, the first signal and the second signal.

9. The braking system of claim 8 wherein said reference velocity estimator estimates a reference velocity for a first wheel based on a tire stretch estimate for a second wheel.

10. The braking system of claim 8 wherein said second signal comprises a signal indicative of a predicted tire stretch.

11. The braking system of claim 8 wherein said tire stretch estimator further functions as a skid estimator that produces a first output when sliding is detected and a second output when sliding is not detected.

12. The braking system of claim 8 wherein said tire stretch estimator receives a wheel speed measurement as a first input and a reference velocity estimate as a second input.

13. The braking system of claim 8 wherein said tire stretch estimator produces an output indicative of an estimated maximum deceleration rate.

14. The system of claim 8 wherein said tire stretch estimator further functions as a skid estimator and the system includes an antiskid controller controlling the brake force applied to a wheel to reduce a detected sliding speed to zero.

15. The system of claim 8 including a deceleration detection system for detecting a first deceleration at a first wheel and a second deceleration at a second wheel, detecting a difference between the first deceleration and the second deceleration and for controlling the braking force applied to at least one of the first wheel and the second wheel to reduce the difference to zero.

* * * * *